US008059316B2

(12) United States Patent
Fujino

(10) Patent No.: US 8,059,316 B2
(45) Date of Patent: Nov. 15, 2011

(54) OPTICAL DEVICE, ADJUSTMENT METHOD FOR THE SAME AND IMAGE FORMING APPARATUS

(75) Inventor: Hitoshi Fujino, Kasugai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1460 days.

(21) Appl. No.: 11/260,157

(22) Filed: Oct. 28, 2005

(65) Prior Publication Data
US 2006/0103885 A1 May 18, 2006

(51) Int. Cl.
H04N 1/04 (2006.01)
H01J 3/14 (2006.01)
G03G 15/01 (2006.01)
G02B 26/08 (2006.01)

(52) U.S. Cl. ........ 358/480; 250/234; 359/223.1; 359/206.1; 359/207.6; 359/218.1; 359/226.2; 347/137

(58) Field of Classification Search ............... None
See application file for complete search history.

(56) References Cited

U.S. PATENT DOCUMENTS

| 5,253,245 | A | * | 10/1993 | Rabedeau | 369/119 |
| 5,365,259 | A | * | 11/1994 | Kanoto et al. | 347/137 |
| 5,963,240 | A | * | 10/1999 | Shinohara et al. | 347/116 |
| 6,256,133 | B1 | | 7/2001 | Suzuki et al. | |
| 6,365,074 | B1 | * | 4/2002 | Su | 264/1.7 |
| 6,717,705 | B2 | | 4/2004 | Takakubo | |
| 6,777,667 | B2 | * | 8/2004 | Koreeda | 250/234 |
| 7,038,194 | B2 | * | 5/2006 | Tomita | 250/236 |
| 7,535,594 | B2 | * | 5/2009 | Yoshizawa et al. | 358/1.4 |
| 2003/0018408 | A1 | * | 1/2003 | Sagae et al. | 700/200 |
| 2003/0183747 | A1 | | 10/2003 | Takakubo | |
| 2003/0197912 | A1 | | 10/2003 | Takakubo | |
| 2004/0190098 | A1 | * | 9/2004 | Hama | 359/204 |
| 2006/0081745 | A1 | * | 4/2006 | Theriault et al. | 248/231.51 |

FOREIGN PATENT DOCUMENTS

| JP | A-4-281421 | 10/1992 |
| JP | A-6-75181 | 3/1994 |
| JP | A-6-337362 | 12/1994 |
| JP | A-10-186225 | 7/1998 |
| JP | A-10-319317 | 12/1998 |
| JP | A-2000-81567 | 3/2000 |
| JP | A-2002-148541 | 5/2002 |
| JP | A-2003-149573 | 5/2003 |
| JP | A-2003-185957 | 7/2003 |

OTHER PUBLICATIONS

Jan. 19, 2010 Office Action issued in Japanese Patent Application No. 2004-315767 (with translation).

* cited by examiner

Primary Examiner — Twyler Haskins
Assistant Examiner — Barbara Reinier
(74) Attorney, Agent, or Firm — Oliff & Berridge, PLC

(57) ABSTRACT

An optical device including: a laser light emitting portion that emits laser light; a polygon mirror having a reflective surface that reflects the laser light, the polygon mirror being driven to rotate and deflecting the laser light emitted from the laser light emitting portion; a first lens through which the laser light reflected by the polygon mirror is transmitted, the first lens refracting the laser light; a second lens through which the laser light having passed through the first lens is transmitted, the second lens refracting the laser light; and an adjustment unit that adjusts at least one of a length of a first optical path between the polygon mirror and the first lens, and a length of a second optical path between the first lens and the second lens.

18 Claims, 7 Drawing Sheets

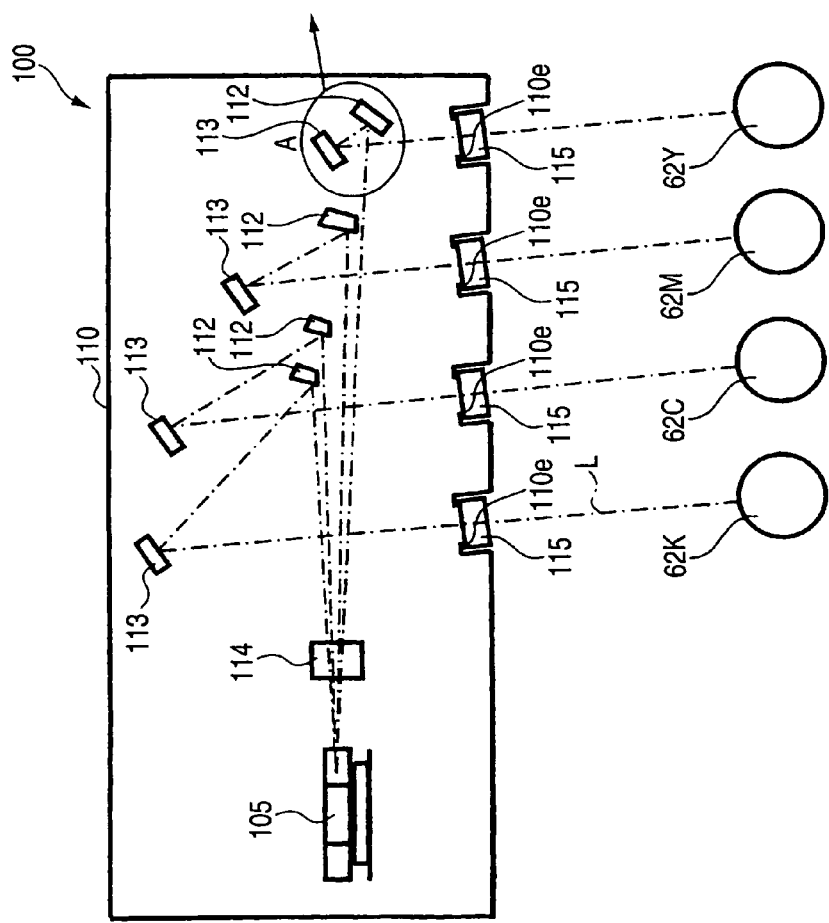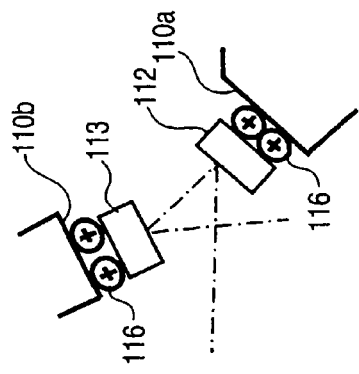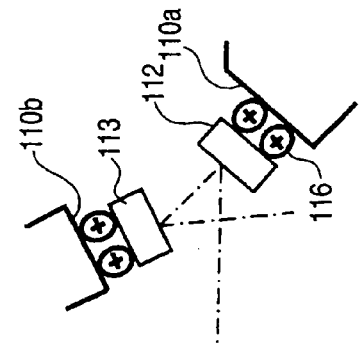

OPTICAL DEVICE, ADJUSTMENT METHOD FOR THE SAME AND IMAGE FORMING APPARATUS

CROSS REFERENCE TO RELATED APPLICATION

This application claims priority from Japanese Patent Application No. 2004-315767, filed on Oct. 29, 2004, the entire subject matter of which is incorporated herein by reference.

TECHNICAL FIELD

Aspects of the invention relate to an optical device that deflects laser light along a scanned surface (a surface to-be-scanned) so as to scan the scanned surface, as well as an adjustment method for the optical device, and an image forming apparatus that employs the optical device.

BACKGROUND

There has hitherto been conceived an optical device having a laser light emitting portion which emits laser light, a polygon mirror which includes a reflective surface for reflecting the laser light and which is driven to rotate, thereby to deflect the laser light emitted from the laser light emitting portion and to scan a scanned surface, a first lens through which the laser light reflected by the polygon mirror is transmitted and which refracts the laser light along the scanned surface, and a second lens through which the laser light having passed through the first lens is transmitted and which refracts the laser light along the scanned surface. In the optical device of this type, the laser light emitted from the laser light emitting portion can be deflected by the polygon mirror so as to scan the scanned surface, and it can be further refracted along the scanned surface through the first and second lenses.

It has also been proposed to enhance an fθ characteristic (so-called "linearity") by adopting an anamorphic aspheric surface for the first lens, and a two-dimensional polynomial aspheric surface for the second lens (refer to, for example, JP-A-2003-149573).

SUMMARY

However, the alterations of lens shapes necessitate plant and equipment investment on a large scale and cannot be easily made. Moreover, even if the lenses of the special shapes as stated above have been obtained, a satisfactory effect might be unattainable due to a slight mounting error. The present provides an optical device that can easily adjust a linearity, etc., by steps after the manufacture of lenses, without altering the shapes of the lenses.

According to an aspect of the invention, there is provided an optical device including: a laser light emitting portion that emits laser light; a deflector that deflects the laser light emitted from the laser light emitting portion; a first lens through which the laser light reflected by the deflector is transmitted, the first lens refracting the laser light; a second lens through which the laser light having passed through the first lens is transmitted, the second lens refracting the laser light; and an adjustment unit that adjusts at least one of a length of a first optical path between the deflector and the first lens, and a length of a second optical path between the first lens and the second lens.

In the optical device thus configured, at least one of the first and second optical path lengths can be adjusted by the adjustment unit. The inventor has found out that a linearity, a scan interval, a scan width, or the like can be adjusted to an appropriate value by adjusting either of the optical path lengths. In the invention, accordingly, even when a measure on a large scale, such as the alteration of the shape of a lens, is not taken, the linearity or the like can be easily adjusted by the adjustment based on the adjustment unit as is made by steps after the manufacture of the lens, and a highly precise scan is enabled. Besides, even in a case where the mounting error of the lens has occurred, a highly precise scan is similarly enabled by the adjustment based on the adjustment unit.

BRIEF DESCRIPTION OF THE DRAWINGS

Illustrative aspects of the invention may be more readily described with reference to the accompanying drawings:

FIG. 3A through FIG. 3C are a sectional view showing the schematic configuration of the scanner unit, and enlarged views of a part A;

DETAILED DESCRIPTION

Figure 1:
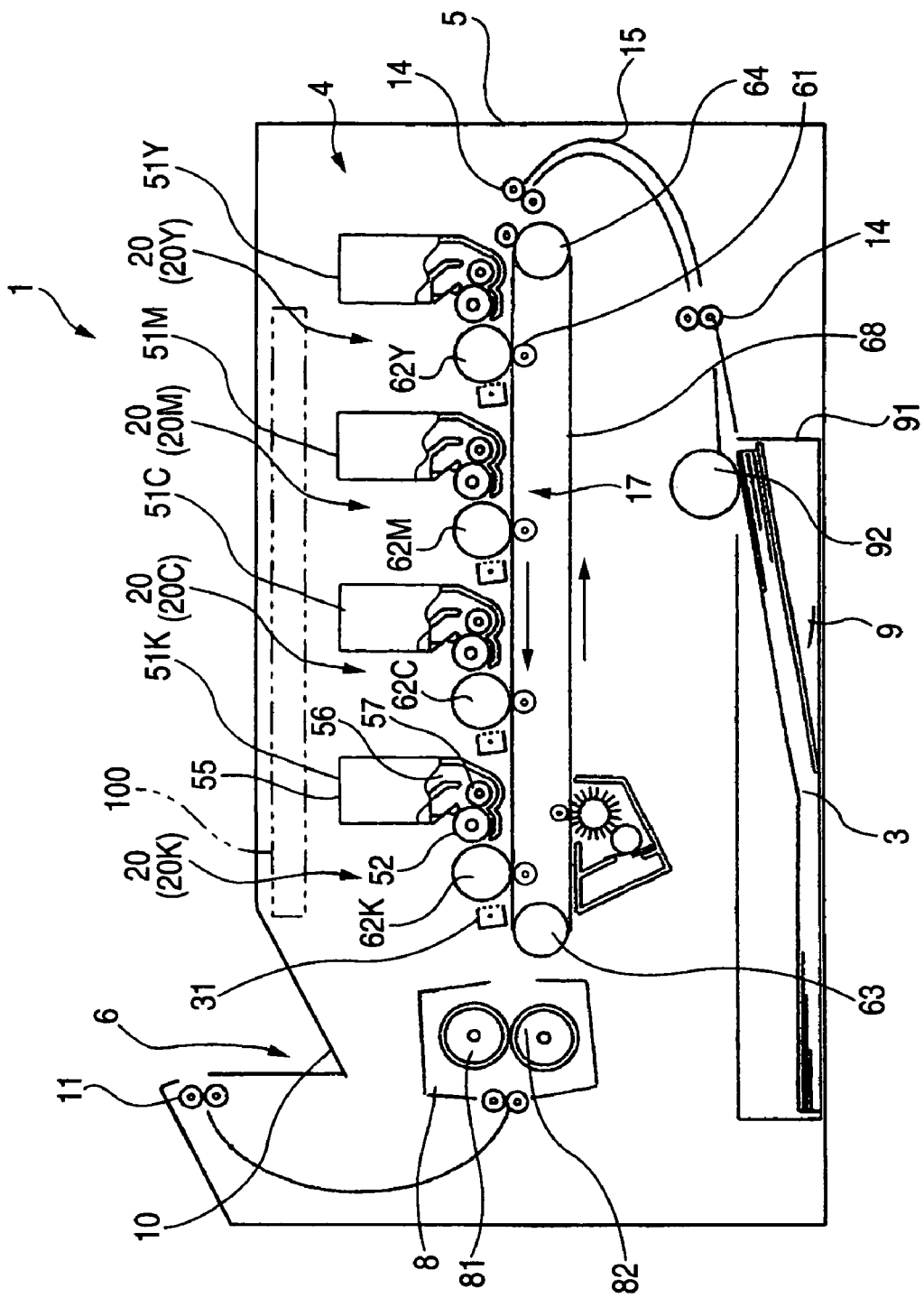
FIG. 1 is a sectional view showing the schematic configuration of a printer.

Now, embodiments of the present invention will be described with reference to the drawings. FIG. 1 is a sectional view showing the schematic configuration of a printer 1 to which an embodiment of the invention is applied. Referring to FIG. 1, the printer 1 is a color laser printer in a tandem scheme of so-called lateral layout type in which four image formation units 20 to be stated later are disposed in an array of horizontal direction. This printer 1 includes in a body casing 5, a paper feed section 9 which serves to feed a recording sheet of paper 3 being a recording medium, an image formation section 4 which serves to form an image on the fed recording sheet of paper 3, and a paper ejection portion 6 which serves to eject the recording sheet of paper 3 formed with the image.

The paper feed section 9 includes a paper feed tray 91 which is detachably mounted on the body casing 5 from a front side (a right side in FIG. 1), at a bottom part within the body casing 5, a paper feed roller 92 which is disposed over (over the front side of) one end part of the paper feed tray 91, and conveyance rollers 14 which are disposed above the paper feed roller 92 and on a downstream side in the conveyance direction of the recording sheet of paper 3, relative to the paper feed roller 92.

The recording sheets of paper 3 are stacked in the paper feed tray 91. The uppermost recording sheets of paper 3 are fed toward the conveyance rollers 14 one by one by the rotation of the paper feed roller 92, and they are successively sent from the conveyance rollers 14 to the interspaces (transfer positions) between a conveyance belt 68 and respective photosensitive drums 62Y, 62M, 62C and 62K (hereinafter also referred to as "62").

Incidentally, a guide member 15 which is disposed in a vertical direction is constructed between the paper feed roller 92 and the conveyance belt 68, and the conveyance rollers 14 in one pair are disposed at each of the entrance and exit of the guide member 15. Owing to this configuration, the recording sheet of paper 3 fed by the paper feed roller 92 is sequentially sent to the interspaces between the conveyance belt 68 and the photosensitive drums 62, by the guide member 15.

The image formation section 4 includes at an intermediate part within the body casing 5, the four image formation units 20Y, 20M, 20C and 20K which form images, a transfer portion 17 which is a transfer unit for transferring the images formed by the respective image formation units 20, onto the recording sheet of paper 3, and a fixing portion 8 which heats and presses the images transferred on the recording sheet of paper 3, so as to fix these images onto the recording sheet of paper 3. Incidentally, the suffixes Y, M, C and K denote the colors of yellow (Y), magenta (M), cyan (C) and black (K), respectively, and they shall be omitted in a case where the colors need not be individually distinguished.

The image formation units 20Y, 20M, 20C and 20K include the photosensitive drums 62Y, 62M, 62C and 62K being photosensitive members, respectively. Besides, each image formation unit 20 is configured in such a way that an electric charger 31 for charging the corresponding photosensitive drum 62, and a development cartridge 51 being a development unit for depositing a toner (a developer) onto the photosensitive drum 62 are arranged around the photosensitive drum 62.

The charger 31 is, for example, a positively-charging charger of scolotron type in which a corona discharge is generated from a charging wire made of tungsten or the like, so as to uniformly charge the surface of the photosensitive drum 62 in the positive polarity.

Besides, a scanner unit 100 which is an optical device for individually exposing the photosensitive drum 62 to light by laser light L (refer to FIG. 3) is disposed over the four image formation units 20. Incidentally, the configuration of the scanner unit 100 will be detailed later. An electrostatic latent image is formed on the surface of each photosensitive drum 62 by the exposure based on the laser light L.

Each development cartridge 51 includes within a development casing 55, a developer hopper 56, a supply roller 57 and a development roller 52. The developer hopper 56 is formed as the internal space of the development casing 55. Besides, the developers in the corresponding color of yellow (Y), magenta (M), cyan (C) or black (K) are accommodated in the developer hoppers 56 of the image formation units 20, respectively.

More specifically, the four development cartridges 51 stated above consist of the development cartridge 51Y in which the developer of yellow (Y) is accommodated in the developer hopper 56, the development cartridge 51M in which the developer of magenta (M) is accommodated in the developer hopper 56, the development cartridge 51C in which the developer of cyan (C) is accommodated in the developer hopper 56, and the development cartridge 51K in which the developer of black (K) is accommodated in the developer hopper 56.

The supply roller 57 is disposed on the obliquely rear side of the lower part of the developer hopper 56, and it has a metal-made roller shaft covered with a roller portion which is formed of an electrically-conductive sponge member. This supply roller 57 is rotatably supported so as to rotate in a direction reverse to the rotating direction of the development roller 52, at a nip part at which it opposes to and touches the development roller 52.

The development roller 52 is rotatably disposed at a position at which it opposes to and touches the supply roller 57. This development roller 52 is constructed in such a way that a metal-made roller shaft is covered with a roller portion formed of an elastic member of electrically-conductive rubber material or the like.

Besides, the transfer portion 17 is disposed so as to oppose to the photosensitive drums 62 obliquely below the development cartridges 51, within the body casing 5. This transfer portion 17 includes a conveyance-belt driving roller 63, a conveyance-belt driven roller 64, the conveyance belt 68 being an endless belt which is spanned between the conveyance-belt driving roller 63 and the conveyance-belt driven roller 64, and transfer rollers 61.

The conveyance-belt driven roller 64 is disposed ahead of the photosensitive drum 62Y of the image formation unit 20Y on the uppermost stream side in the conveyance direction of the recording sheet of paper 3, and on the upper front side of the paper feed roller 92. Besides, the conveyance-belt driving roller 63 is disposed behind the photosensitive drum 62K of the black image formation unit 20K on the lowermost stream side in the conveyance direction of the recording sheet of paper 3, and on a lower oblique front side relative to the fixing portion 8. Further, the conveyance belt 68 is disposed so that its outer surface opposes to and touches all the photosensitive drums 62 of the individual image formation units 20.

Here, owing to the drive of the conveyance-belt driving roller 63, the conveyance-belt driven roller 64 is driven, whereby the conveyance belt 68 travels round and between the conveyance-belt driving roller 63 and the conveyance-belt driven roller 64.

Besides, the transfer rollers 61 are respectively disposed so as to oppose to the photosensitive drums 62 of the individual image formation units 20 with the conveyance belt 68 held therebetween, on the inner side of the wound conveyance belt 68. Each of the transfer rollers 61 is constructed in such a way that a metal-made roller shaft is covered with a roller portion formed of an elastic member of electrically-conductive rubber material or the like.

Besides, each of the transfer rollers 61 is rotatable counterclockwise so as to rotate in the same direction as the traveling direction of the conveyance belt 68, at its touch surface opposing to and touching the conveyance belt 68. During the transfer, an appropriate transfer bias is applied between the transfer roller 61 and the photosensitive drum 62 by a constant-current control in a direction in which the developer image adhering on the surface of the photosensitive drum 62 is transferred onto the recording sheet of paper 3.

Besides, the fixing portion 8 is disposed behind the image formation units 20 and the transfer portion 17, and on the downstream side in the conveyance direction. This fixing portion 8 includes a heating roller 81 and a pressing roller 82. The heating roller 81 is constructed of a metallic pipe whose surface is formed with a mold releasing layer, and a halogen lamp is mounted inside the heating roller 81 so as to extend along the axial direction thereof. Here, the surface of the heating roller 81 is heated to a fixation temperature by the halogen lamp. Besides, the pressing roller 82 is disposed so as to press the heating roller 81.

Further, the paper ejection portion 6 is disposed on the downstream side of the fixing portion 8 in the conveyance direction, at an upper part within the body casing 5. Besides, the paper ejection portion 6 includes a pair of paper ejection rollers 11 by which the recording sheet of paper 3 having completed the fixation of the image is ejected into a paper ejection tray 10, and the paper ejection tray 10 which is disposed on the downstream side of the paper ejection rollers 11 and in which the recording sheet of paper 3 having finished all image formation steps is accumulated.

Figure 2:
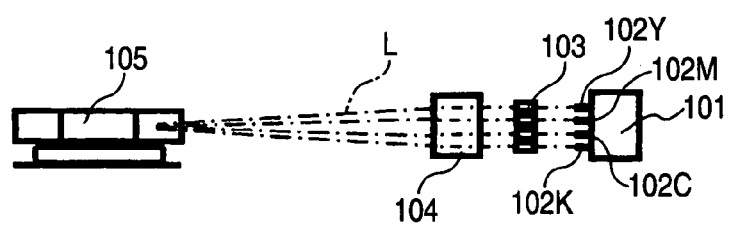
FIG. 2 is an explanatory view showing a configuration in the vicinity of a light source portion of a scanner unit in the printer.

Next, FIG. 3A is a sectional view showing the schematic configuration of the scanner unit 100, and FIG. 2 is an explanatory view showing a configuration in the vicinity of a light source portion 101 which is the laser light emitting portion of the scanner unit 100.

As shown in FIG. 2, the light source portion 101 includes four semiconductor lasers 102Y, 102M, 102C and 102K each emitting laser light L, at positions differing in a vertical direction (sub-scanning direction). The semiconductor lasers 102Y, 102M, 102C and 102K emit the laser lights L individually at timings corresponding to image data in the colors of yellow (Y), magenta (M), cyan (C) and black (K), respectively. Four collimating lenses 103 by which divergent lights from the semiconductor lasers 102 are converted into parallel lights are disposed in front of the respective semiconductor lasers 102Y-102K, the four laser lights L converted into the parallel lights by the collimating lenses 103 are refracted in the sub-scanning direction by a cylindrical lens 104, and the refracted lights are projected onto the common reflective surface of a polygon mirror 105 at incident angles different from one another.

As shown in FIG. 3A, the polygon mirror 105 is fixed to the predetermined position of a frame 110 forming the housing of the scanner unit 100, so as to be rotatable by a polygon motor not shown. Although the light source portion 101, collimating lenses 103 and cylindrical lens 104 mentioned above are not shown in FIG. 3A, either, they are fixed to the predetermined positions of the frame 110.

Four mirrors 112 and four mirrors 113 are respectively disposed inside the frame 110 for the four laser lights L reflected by the polygon mirror 105, in such a manner that their positions are adjustable as stated later. Owing to the reflections of the mirrors 112 and 113, the laser light L emitted from the semiconductor laser 102Y is projected onto the surface of the photosensitive drum 62Y, the laser light L emitted from the semiconductor laser 102M is projected onto the surface of the photosensitive drum 62M, the laser light L emitted from the semiconductor laser 102C is projected onto the surface of the photosensitive drum 62C, and the laser light L emitted from the semiconductor laser 102K is projected onto the surface of the photosensitive drum 62K, whereby the electrostatic latent images corresponding to the individual colors are respectively formed on the surfaces of the photosensitive drums 62.

Besides, an fθ lens 114 which is common to the four laser lights L is dispersed in optical paths extending from the polygon mirror 105 to the respective mirrors 112, in such a manner that its position is adjustable as stated later. Also, one cylindrical lens 115 is disposed in an optical path which extends from each mirror 113 to the corresponding photosensitive drum 62. Here, the fθ lens 114 is a lens which chiefly makes an fθ correction, and the cylindrical lens 115 is a lens which chiefly makes an optical face tangle error correction. In this embodiment, however, also the cylindrical lens 115 has the function of refracting the laser light L along a scanned surface, to some extent.

FIGS. 3B and 3C are the enlarged views of a part A in FIG. 3A. As shown in FIGS. 3B and 3C, the frame 110 is provided with four reception faces 110a for receiving the corresponding mirrors 112, and four reception faces 110b for receiving the corresponding mirrors 113. Two, elliptic eccentric cams 116 (corresponding to adjustment unit) whose rotational angles are adjustable with a plus screwdriver are interposed between each of the reception faces 110a and 110b and each of the mirrors 112 and 113. The mirrors 112 and 113 are respectively urged toward the reception faces 110a and 110b by leaf springs not shown. Besides, the vicinities of the other mirrors 112 and 113 than at the part A are similarly configured.

Therefore, when the minor axis of each eccentric cam 116 is located between the reception face 110a or 110b and the mirror 112 or 113 as shown in FIG. 3B, the mirrors 112 and 113 are spaced most. Conversely, when the major axis of each eccentric cam 116 is located between the reception face 110a or 110b and the mirror 112 or 113 as shown in FIG. 3C, the mirrors 112 and 113 are approached most.

Besides, the reception faces 110a and 110b corresponding to the respective colors are spaced more in sets nearer to the polygon mirror 105, whereby the optical path lengths of the laser lights L proceeding from the polygon mirror 105 to the photosensitive drums 62 can be equalized for all the colors.

Figure 4A:
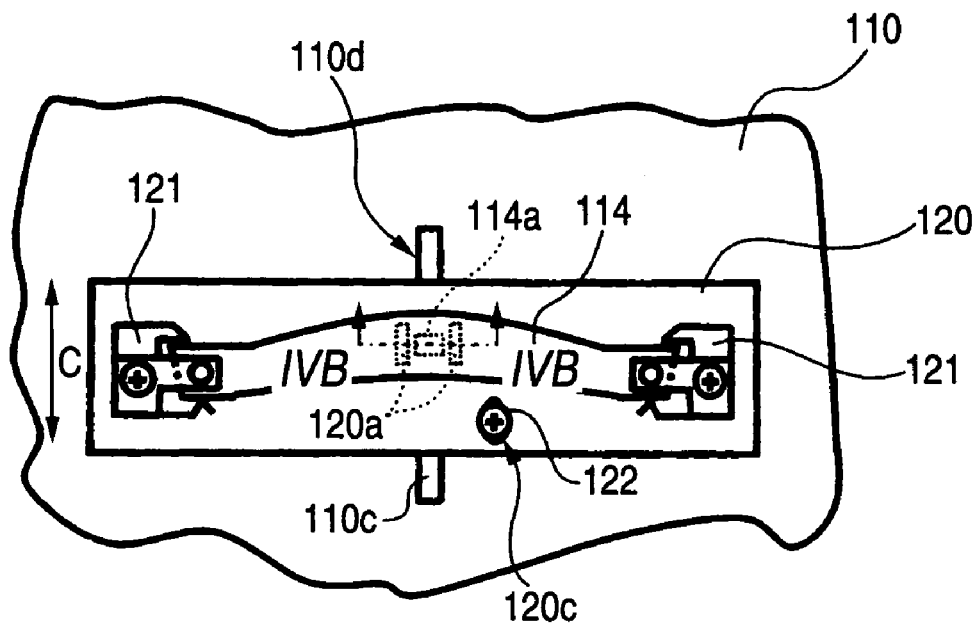
FIG. 4A and FIG. 4B are a plan view showing a configuration in the vicinity of an fθ lens of the scanner unit, and a sectional view taken along line IVB-IVB indicated in FIG. 4A, respectively.
Figure 4B:
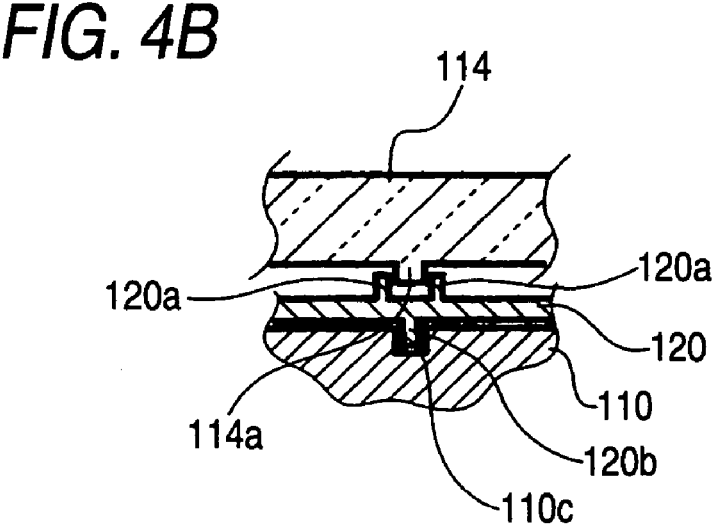

Next, FIG. 4A is a plan view showing a configuration in the vicinity of the fθ lens 114, while FIG. 4B is a sectional view taken along line IVB-IVB indicated in FIG. 4A. As shown in FIGS. 4A and 4B, a projection 114a is protruded centrally of the lower surface of the fθ lens 114. Here, the projection 114a is engaged between a pair of lugs 120a which are protruded centrally of the upper surface of a lens fixation member 120, and both the ends of the fθ lens 114 are fixed to the upper surface of the lens fixation member 120 through fittings 121, whereby the fθ lens 114 is fixed to the upper surface of the lens fixation member 120.

Besides, a lug 120b is protruded centrally of the lower surface of the lens fixation member 120. The frame 110 is provided with a guide groove 110c being an adjustment unit as extends in the direction of the optical axis of the laser light L (that is, in the front and rear direction of the printer 1). The lens fixation member 120 has the lug 120b fitted into the guide groove 110c, whereby this member 120 is supported so as to be movable in the direction of arrow C in FIG. 4A. Besides, the lens fixation member 120 is formed with a slot 120c which is provided so as to be long in the direction of the arrow C. After the lens fixation member 120 has been moved to an appropriate position, a screw 122 is inserted into the slot 120c, and it is threadably engaged with a threaded hole, not shown, provided in the frame 110, whereby the lens fixation member 120 is positioned, and in turn, the fθ lens 114 is positioned.

Owing to the above configuration, in the printer 1 of this embodiment, an optical path length which extends from the polygon mirror 105 to each cylindrical lens 115 being a second lens is adjustable by moving the mirrors 112 and 113, and an optical path length which extends from the polygon mirror 105 to the fθ lens 114 is adjustable by moving this fθ lens 114 being a first lens. Besides, the two mirrors 112 and 113 are simultaneously moved as stated before, whereby the above optical path lengths can be adjusted without changing the incident angle of the laser light L to the cylindrical lens 115 and without moving either of the fθ lens 114 and the cylindrical lens 115. Especially, no change in the incident angle to the cylindrical lens 115 signifies no change in the exposure position of the photosensitive drum 62, and this is more favorable.

Figure 5:
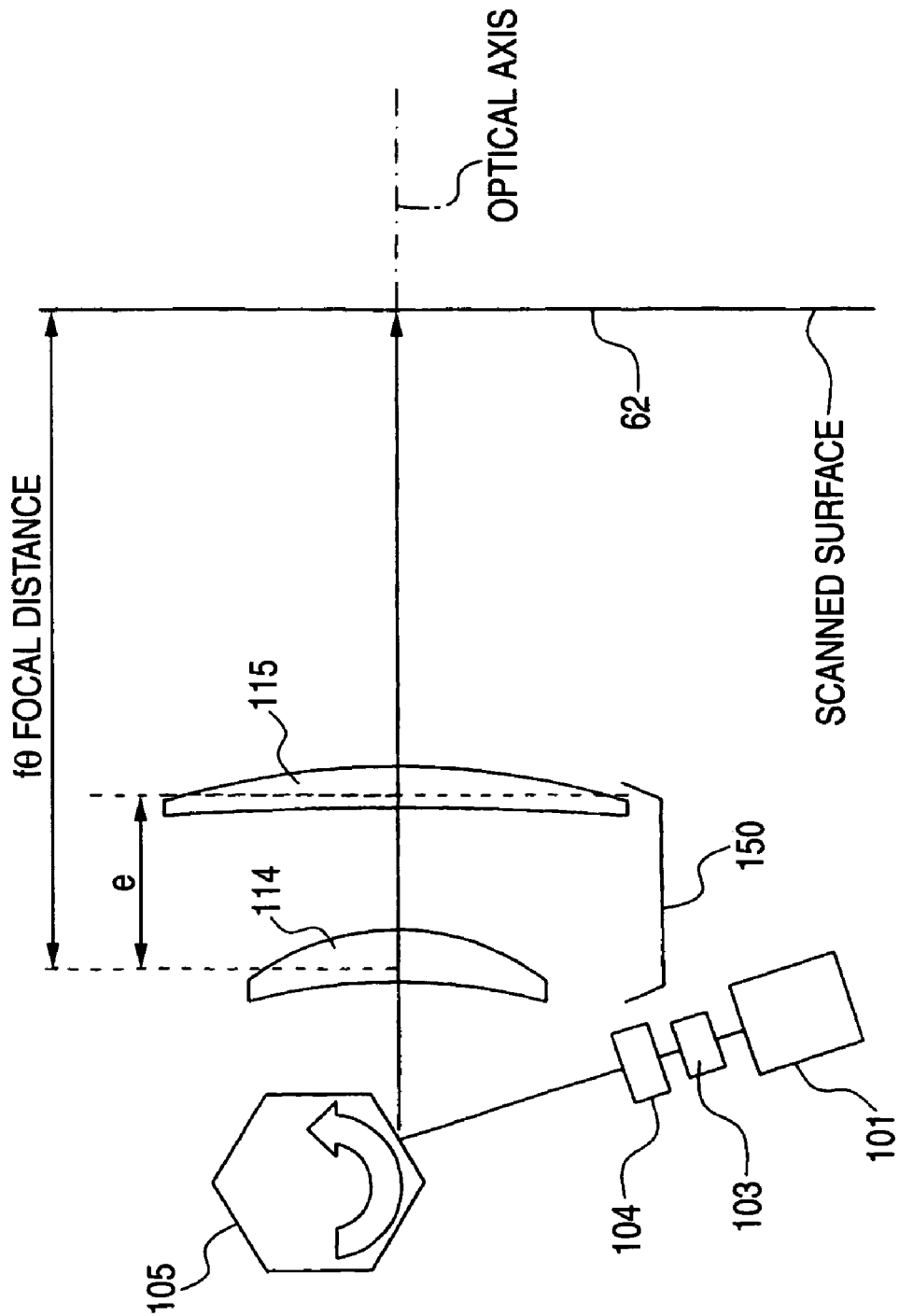
FIG. 5 is an explanatory view schematically showing a scanning optical system of the printer as expanded in plan.

Next, the inventor eagerly made studies on advantages which are attained by adjusting the optical path lengths. When the scanning optical system of the printer 1 is expanded in plan and shown in model-like fashion, FIG. 5 is obtained. As stated before, both the fθ lens 114 and the cylindrical lens 115 refracts the laser light L along the scanned surface, so that the two lenses 114 and 115 can be considered as a single scan lens 150. Besides, the surface of the photosensitive drum 62 becomes a scanned surface.

Letting "$f_1$" denote the focal distance of the fθ lens 114, "$f_2$" denote the focal distance of the cylindrical lens 115, and "e" denote the interval between the principal point (second principal point) of the fθ lens 114 and the principal point (first principal point) of the cylindrical lens 115, the combined focal distance "f'" of both the lenses ("fθ focal distance" in FIG. 5) is expressed by the following formula:

$$f' = \frac{1}{\frac{1}{f_1} + \frac{1}{f_2} - \frac{e}{f_1 \cdot f_2}}$$

Accordingly, the combined focal distance f' of the scan lens 150 considered by combining the fθ lens 114 and the cylindrical lens 115 can be adjusted in such a way that the value of the interval "e" is changed by moving the mirrors 112 and 113 as stated before.

It has also been revealed that the fθ lens 114 or/and the cylindrical lens 115 is/are moved, whereby the deviation of an actual scan position from a reference scan position (or so-called "linearity") varies as stated below. By the way, in the ensuing description, the "movement of the cylindrical lens 115" will signify to change the optical path length extending to the cylindrical lens 115, by moving the mirrors 112 and 113 as stated before.

Figure 6A:
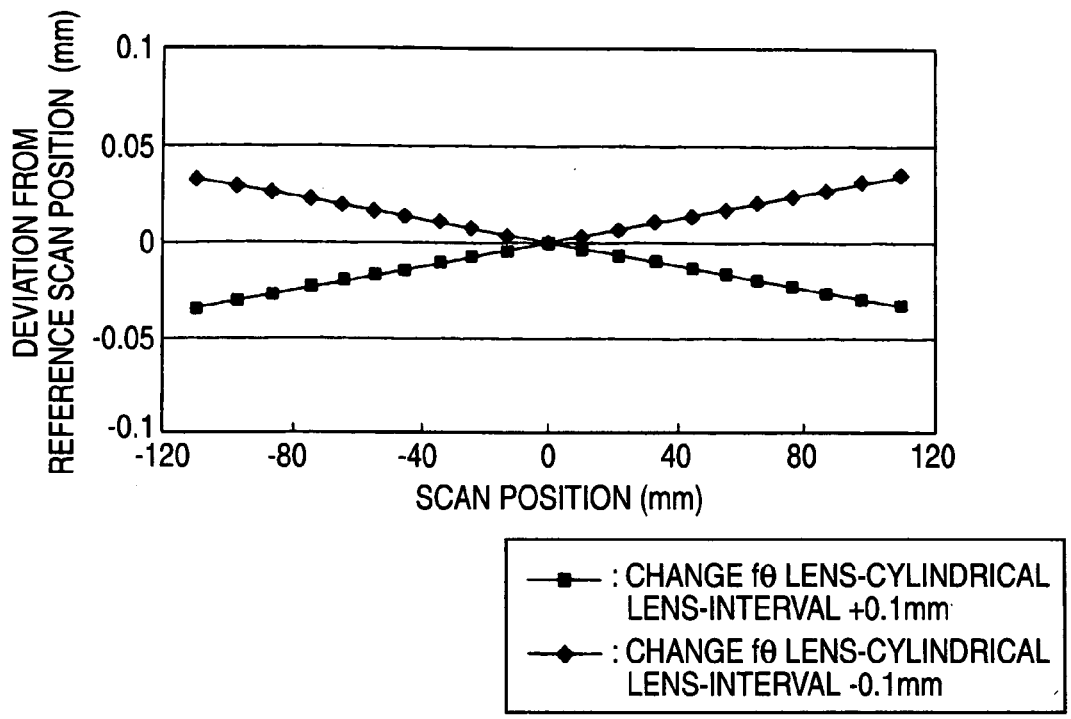
FIG. 6A and FIG. 6B are explanatory diagrams showing variations of linearities as depend upon the positions of lenses in the scanning optical system.
Figure 6B:
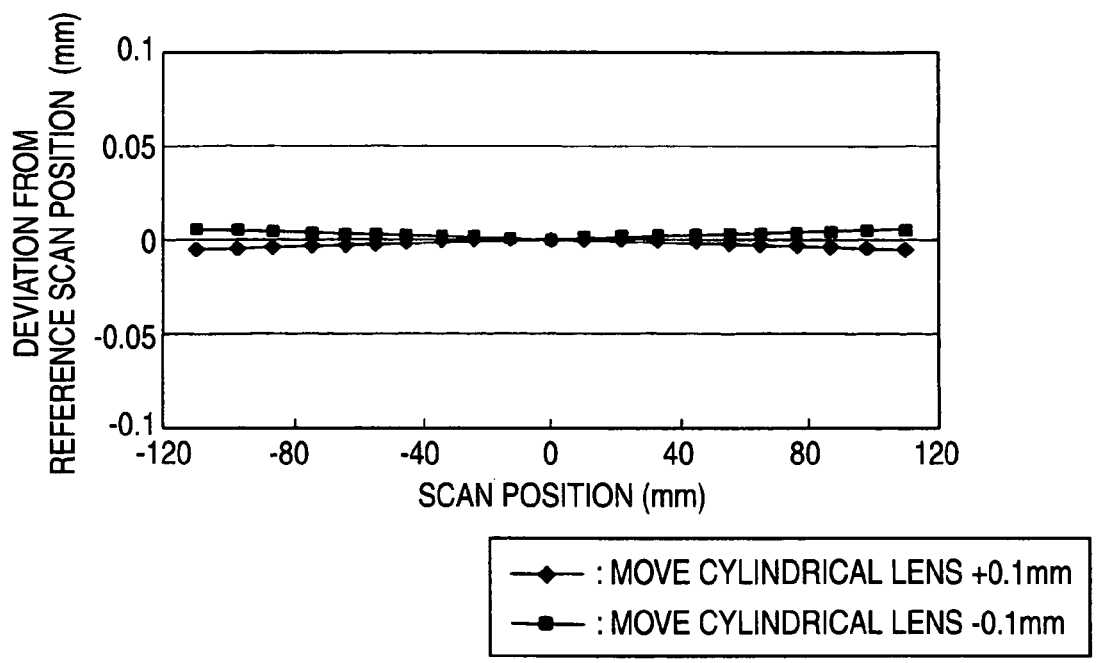

FIG. 6A shows the variations of the linearity in the cases where the interval between the fθ lens 114 and the cylindrical lens 115 was changed by moving both these lenses so that the center of the optical path extending from the fθ lens 114 to the cylindrical lens 115 might not move. Besides, FIG. 6B shows the variations of the linearity in the cases where only the cylindrical lens 115 was moved. Incidentally, the configuration of the scanning optical system employed for obtaining the data was as indicated in Table 1.

TABLE 1

| CONFIGURATION OF SCANNING OPTICAL SYSTEM | UNIT |
|---|---|
| fθ focal distance | 230 mm |
| Scan width | 210 mm |
| Design wavelength | 780 nm |
| Incident angle to Polygon mirror 105 | 90 degrees |
| Focal distance of Cylindrical lens 104 | 100 mm |
| ARRANGEMENT OF SCAN LENS | |
| Polygon mirror 105 - Entrance surface of fθ lens 114 | 37 mm |
| Entrance surface of fθ lens 114 - Exit surface of fθ lens 114 | 10 mm |
| Exit surface of fθ lens 114 - Entrance surface of Cylindrical lens 115 | 127.5 mm |
| Entrance surface of Cylindrical lens 115 - Exit surface of Cylindrical lens 115 | 4 mm |
| Exit surface of Cylindrical lens 115 - Photosensitive drum 62 | 95.9 mm |
| SURFACE CONFIGURATION OF SCAN LENS | |
| Entrance surface of fθ lens 114 | Spherical surface |
| Exit surface of fθ lens 114 | Rotation-symmetrical aspheric surface |
| Entrance surface of Cylindrical lens 115 | Toric surface |
| Exit surface of Cylindrical lens 115 | Rotation-symmetrical aspheric surface |

In the printer 1 of this embodiment, therefore, the linearity, etc., can be easily adjusted by moving the fθ lens 114 or/and the cylindrical lens 115, so that a highly precise scan is enabled. Moreover, even in a case where the mounting error of the fθ lens 114 or the cylindrical lens 115 has occurred, a highly precise scan is similarly enabled by moving these lenses as stated before.

Incidentally, the linearity and a scan width are closely related, and it is sometimes easier to measure the scan width, than to measure the actual linearity. Therefore, the adjustment of the linearity may well be replaced with that of the scan width. Also on this occasion, the linearity is adjusted substantially favorably, and a highly precise scan is permitted.

Further, in this embodiment, the position of the fθ lens 114 is also adjustable in the direction of the optical axis as stated before. Therefore, the optical path lengths of the respective colors can be finely adjusted individually by the eccentric cams 116 after the balance of the whole optical system has been secured by adjusting the position of the fθ lens 114. In this embodiment, accordingly, a scan of still higher precision is permitted. Moreover, since the fine adjustments based on the eccentric cams 116 can be made independently without exerting any influence on the optical path lengths of the laser lights L corresponding to the other colors, the adjustments are easy.

Besides, in case of a color laser printer of tandem scheme in the prior art, a dot clock needs to be adjusted every color for the purpose of correcting the deviation of the linearity, but such is unnecessary in the printer 1 of this embodiment. Accordingly, a color image which is highly precise and clear can be formed more easily.

Further, in the foregoing embodiment, a scan of still higher precision is permitted when the optical characteristics of the fθ lens 114 and the cylindrical lenses 115, and the shape of the frame 110 are individually inspected, so as to employ attribute information determined in consideration of the inspection. Now, an example utilizing such attribute information will be described.

Figure 7:
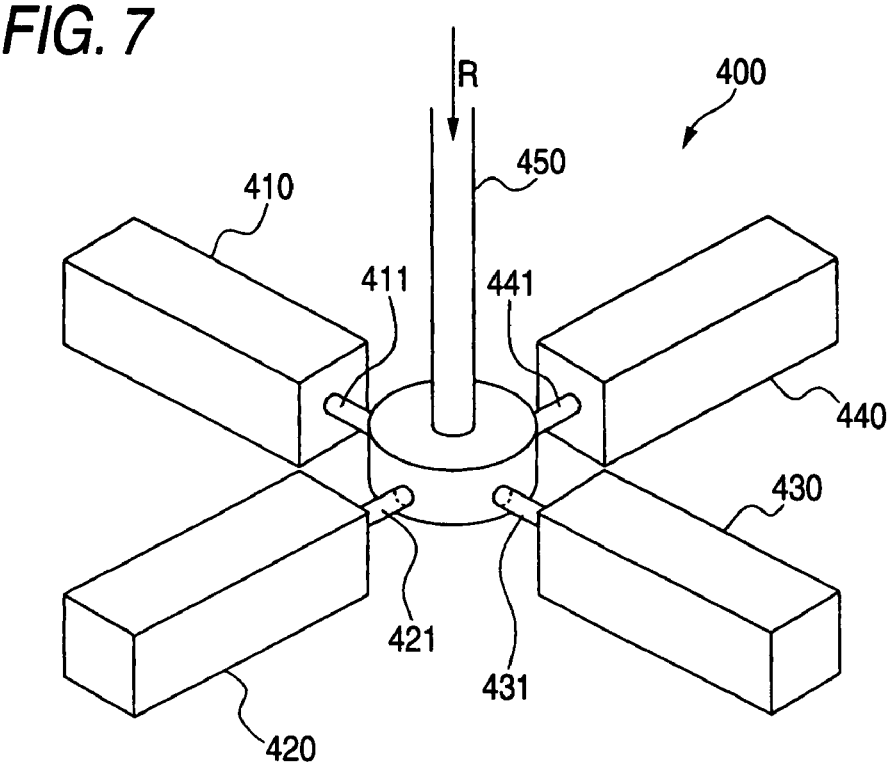
FIG. 7 is a perspective view showing an example of a metal mold for molding the fθ lenses.

By way of example, FIG. 7 shows a metal mold 400 for molding the fθ lenses 114. In the metal mold 400 of this type, a plurality of cavities of identical specifications (cavities 410-440 in the example of FIG. 7) are usually provided. In the metal mold 400, the four cavities 410-440 are radially disposed around a pouring pipe 450 into which a resin is poured in the direction of arrow R. Besides, the resin is poured into the respective cavities 410, 420, 430 and 440 through pouring pipes 411, 421, 431 and 441, whereby the fθ lenses 114 of identical specifications can be manufactured by injection molding.

Figure 8:
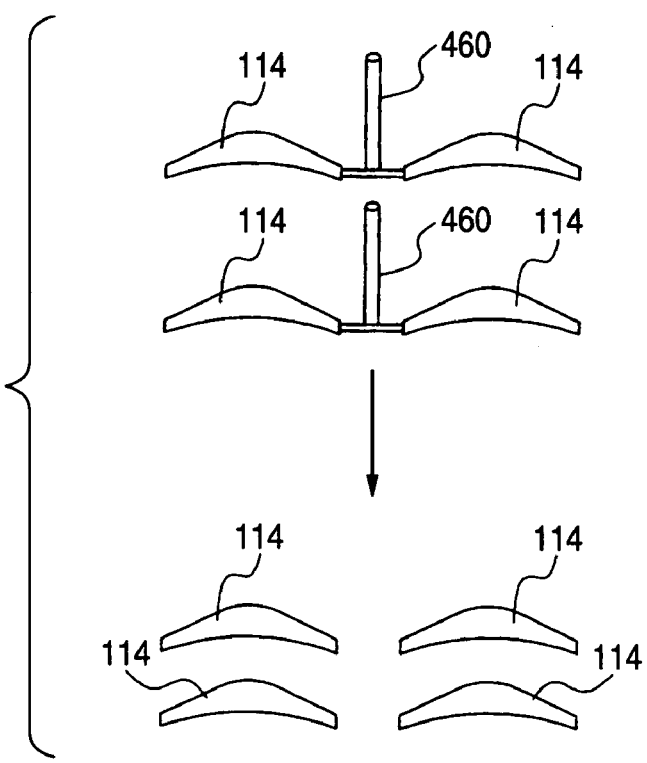
FIG. 8 is an explanatory view showing a method of manufacturing the fθ lenses employing the metal mold.

As shown in FIG. 8, the fθ lenses 114 after the molding are cut out of the resin 460 hardened remaining in the pouring pipes 411, 421, 431, 441 and 450, whereby the four fθ lenses 114 are obtained. Incidentally, the fθ lenses 114 after the molding are radially formed around the resin 460 remaining in the pouring pipe 450, but diagrams rotated 90 degrees around the resin 460 at that part are depicted in parallel, thereby to show the fθ lenses 114 in model-like fashion in FIG. 8.

Information on which of the cavities 410-440 the fθ lenses 114 were manufactured by, is closely relevant to the shapes of the lenses. Besides, even in the fθ lenses 114 manufactured by the same cavities 410-440, the lens shapes are sometimes delicately different depending upon circumstances in the molding operation. In this embodiment, therefore, information expressive of the cavity by which each of the fθ lenses 114 and the cylindrical lenses 115 was manufactured, and information items such as the scan width, the linearity and a scan line curvature measured for each individual lens, are associated as a set, and they are stored as the attribute information in a bar code seal, an ID tag or the like (corresponding to informing unit), which is affixed to the lens. Incidentally, regarding the measurements of the scan width, etc., the lens to-be-measured is set on a measurement equipment, the lens is scanned with laser light, the laser light having passed through the lens is projected onto a surface on which a plurality of photo sensors are arrayed, and the scan width, etc., are measured on the basis of outputs from the photo sensors thus obtained.

Besides, also the frames 110 undergo delicate differences in shapes, depending upon circumstances in a molding operation. Therefore, the shapes of the reception faces 110a and 110b, the shape of the holding portion 110d (refer to FIG. 4(A)) of the fθ lens 114 in the vicinity of the guide groove 110c, and the shapes of the holding portions 110e (refer to FIG. 3(A)) of the cylindrical lenses 115 are measured for each individual frame 110, and they are similarly affixed to the frame 110 as the attribute information. Incidentally, regarding the measurements of the shapes, the frame to-be-measured is set on a measurement equipment, light is projected onto the frame, and the light reception timings of resulting reflected lights are detected, whereby the profile (dimensional) measurement of the frame is performed by the optical technique.

The appropriate combination of the frame 110, fθ lens 114 and cylindrical lens 115 is selected, or the initial value of the rotational angle of the eccentric cam 116 is set by referring to the attribute information, whereby a scan of still higher precision is permitted. Incidentally, the incident angles of the laser lights L to the fθ lens 114 in the sub-scanning direction differ between the color yellow (Y) as well as black (K) and the color magenta (M) as well as cyan (C). It is known that, when the incident angles differ, also the linearities differ. It is therefore recommended to select lenses having similar attribute information, as the two cylindrical lenses 115 corresponding to the colors yellow (Y) and black (K), and to select lenses having similar attribute information, as the two cylindrical lenses 115 corresponding to the colors magenta (M) and cyan (C).

Although various configurations are considered as the configuration of the adjustment unit, in a case where a mirror which reflects the laser light exists between the first lens and the second lens, and where the adjustment unit adjusts the length of the optical path between the first lens and the second lens, by altering a position of the mirror, an advantage as stated below is further attained. In this case, the optical path length is adjusted by altering the position of the mirror, and hence, the adjustment can be made more easily than in the case of altering the position of the lens.

Further, in this case, the adjustment unit can also be configured in such a way that at least two such mirrors exist, and that the adjustment unit alters both positions of such at least two mirrors, whereby an incident angle of the laser light to the second lens in a sub-scanning direction does not change before and after the alterations. In this case, the incident angle to the second lens in the sub-scanning direction does not change, so that the adjustment becomes still easier. Especially, in a case where the optical device is utilized for exposing the photosensitive member of an image forming apparatus to light, the exposure position of the photosensitive member does not change, either, owing to no change in the incident angle to the second lens in the sub-scanning direction, and hence, the configuration is more favorable.

Besides, the adjustment unit may well change the length of the optical path by altering a position of at least one of the first lens and the second lens. In this case, the position of the lens is altered, whereby the adjustment can be made more easily than in the case where the position of the polygon mirror is altered. Moreover, as compared with the case where the positions of both the polygon mirror and the lens are altered, the adjustment unit can be simplified in configuration, thereby to attain reduction in cost.

By the way, both the first lens and the second lens may be ones which, at least, refract the laser light along the scanned surface, and various combinations are considered. Here, in a case where the first lens is a lens which chiefly makes an fθ correction and where the second lens is a lens which chiefly makes an optical face tangle error correction, an advantage as stated below is further attained. In this case, the lens which chiefly makes the fθ correction and the lens which chiefly makes the optical face tangle error correction are separately disposed, so that the fθ correction and the optical face tangle error correction can be favorably made.

Besides, in a case where at least one of the first lens and the second lens is provided with a first informing unit for informing attribute information determined upon individually inspecting optical characteristics of the lens, an advantage as stated below is further attained. In this case, an appropriate lens is selected with reference to the attribute information reported by the first informing unit, whereby a scan of still higher precision is permitted. Incidentally, any of various means such as a bar code seal and an ID tag can be considered as the informing unit.

Besides, in this case, when characteristics concerning a scan position are contained in the optical characteristics, an effect as stated below is further attained. In order to perform the highly precisely scan, characteristics concerning the scan position (a scan width, a scan region, a linearity, a scan line curvature, etc.) are the most important among the optical characteristics. Accordingly, a scan of still higher precision is permitted by selecting an appropriate lens with reference to the attribute information reflective of such characteristics.

Further, in a case where the characteristics concerning the scan position are characteristics concerning the scan position in a main-scanning direction, an advantage as stated below is further attained. In order to perform the highly precise scan, the characteristics concerning the scan position in the main-scanning direction are more important among the characteristics concerning the scan position. Accordingly, a scan of still higher precision is permitted by selecting an appropriate lens with reference to the attribute information reflective of the characteristics.

Besides, in a case where at least one of the first lens and the second lens is a lens which was molded by injection molding and where the first informing unit provided in the lens also informs information on a cavity by which the lens was molded, an advantage as stated below is further attained. The information on the cavity is closely relevant to the shape of the lens molded by the cavity. Accordingly, a more appropriate lens can be selected by referring also to the information on the cavity as reported by the first informing unit.

Besides, in a case where a frame which holds the first lens and the second lens is further comprised and where the frame is provided with a second informing unit for informing attribute information determined upon inspecting shapes of holding portions for the first lens and the second lens, in the frame, an advantage as stated below is further attained. The shapes of the holding portions for the individual lenses are closely relevant to the positions and attitudes of the respective lenses held in the frame. Accordingly, an optical device which permits a scan of still higher precision can be manufactured by referring to the attribute information reported by the second informing unit.

Besides, in a case where the laser light emitting portion can emit laser lights from a plurality of positions differing in the sub-scanning direction, where the second lenses are respectively disposed in correspondence with the laser lights emitted from the individual positions, where the first lens can enter thereinto the laser lights emitted from the plurality of positions, and are disposed in a number smaller than that of the second lenses, and where the adjustment unit can adjust lengths of optical paths between the first lens and the second lenses, without altering positions of the first lens, advantages as stated below are further attained.

In this case, since the laser lights are entered into the first lens at several incident angles in the sub-scanning direction, the linearities of the respective laser lights need to be individually adjusted. The adjustment unit can adjust the lengths of the optical paths between the first lens and the second lenses without altering the positions of the first lens, so that in adjusting the linearity of one laser light, no influence is exerted on the linearity of any other laser light. That is, the optical path lengths between the first lens and the second lenses for the respective laser lights can be made adjustable individually and independently, and a scan of still higher precision is permitted.

Besides, in this case, when the adjustment unit can alter also the position of the first lens, an advantage as stated below is further attained. In this case, after the balance of the whole optical system has been secured by adjusting the position of the first lens, the optical path lengths are individually adjusted, whereby fine adjustments for the respective laser lights can be made. In this case, accordingly, a scan of still higher precision is permitted.

An adjustment method for the optical device is characterized in that the adjustment based on the adjustment unit is made on the basis of the attribute information informed by either of the informing units. When the adjustment based on the adjustment unit is made on the basis of the attribute information in this manner, the adjustment is facilitated still more.

Besides, the image forming apparatus is characterized by comprising the optical devices stated above; a photosensitive member which is exposed to light by the optical device, thereby to be formed with an electrostatic latent image on a surface thereof; a development unit for depositing a developer onto the electrostatic latent image, thereby to develop the electrostatic latent image; and a transfer unit for transferring the developer deposited on the surface of the photosensitive member by the development unit, onto the recording medium.

In the image forming apparatus thus configured, owing to the adjustment based on the adjustment unit provided in the optical device, a highly precise scan based on the optical device is permitted, and in turn, the photosensitive member can be scanned at a high precision. Therefore, the electrostatic latent image can be highly precisely formed on the surface of the photosensitive member. After the developer has been deposited onto the electrostatic latent image by the development unit, it is transferred onto the recording medium by the transfer unit, whereby a clear image can be highly precisely formed on the recording medium.

Besides, in the image forming apparatus of this type, when a linearity is not accurate, it used to be performed to adjust a dot clock which regulates the timing of the emission of laser light. Here, in the case of adjusting the linearity as stated before, the adjustment can be made much more easily than in the case of adjusting the dot clock.

Besides, in such an image forming apparatus, in a case where the optical device is one which includes the laser light emitting portion capable of emitting the laser lights from the plurality of different positions as stated before, where such photosensitive members and such development unit are disposed in correspondence with the laser lights emitted from the respective positions, and where the colors of the developers which the respective development unit deposit onto the electrostatic latent images of the corresponding photosensitive members are different from one another, an advantage as stated below is further attained.

In this case, the respective photosensitive members are highly precisely scanned as stated before, whereby images which conform to the developers of the respective colors as deposited by the corresponding development unit can be formed at a high precision. In this case, accordingly, clear multicolored images can be formed on the medium to-be-recorded.

Incidentally, the present invention is not restricted to the foregoing embodiment at all, but it can be carried out in various aspects within a scope not departing from the purport thereof. By way of example, the eccentric cams 116 are individually turned in the embodiment, but they may well be connected by a belt, a gear, a link or the like so as to be simultaneously turned. In this case, the adjustments are facilitated still more. In the embodiment, however, since the four eccentric cams 116 for the respective colors dare not be similarly rotated, the incident angles or incident positions of the laser lights L to the cylindrical lenses 115 can be altered, and scan line curvatures, etc. can also be corrected.

Besides, a third lens which refracts the laser light L along the scanned surface may well be disposed in addition to the fθ lens 114 and each cylindrical lens 115. Further, if the reflective surface of the polygon mirror 105 is sufficiently large, the respective laser lights L may well be entered into the fθ lens 114 as parallel lights, by omitting the cylindrical lens 104. In this case, the linearity does not vary every color as in the foregoing, so that the adjustments are facilitated still more.

Further, all the laser lights L are entered into the single fθ lens 114 in the embodiment, but one fθ lens may well be disposed in correspondence with two colors or one color. In this case, it is facilitated still more to enter the individual laser lights L into the fθ lenses as parallel lights. Besides, the fθ lens 114 is movably constructed in the embodiment, but the cylindrical lenses 115 may well be movably constructed.

What is claimed is:
1. An optical device comprising:
a laser light emitting portion that emits laser light;
a deflector that deflects the laser light emitted from the laser light emitting portion;
a first lens through which the laser light reflected by the deflector is transmitted, the first lens refracting the laser light;
a second lens through which the laser light having passed through the first lens is transmitted, the second lens refracting the laser light;
an adjustment unit, which is provided at the first lens, that adjusts each of a length of a first optical path between the deflector and the first lens and a length of a second optical path between the first lens and the second lens;
a mirror disposed in the second optical path, the mirror reflecting the laser light; and
a mirror adjustment unit, which adjusts the length of the second optical path by changing a position of the mirror,
wherein the mirror adjustment unit corresponds to elliptic eccentric cams whose rotational angles are adjustable, and
wherein the elliptic eccentric cams include a set of two adjacent cams, which are provided at the mirror.
2. The optical device according to claim 1, wherein the deflector is a polygon mirror having a reflective surface that reflects the laser light, the polygon mirror being driven to rotate and deflecting the laser light emitted from the laser light emitting portion.

3. The optical device according to claim 1, wherein the mirror comprises at least two mirrors, and the mirror adjustment unit alters both positions of the at least two mirrors, whereby an incident angle of the laser light to the second lens in a sub-scanning direction does not change before and after the alterations.

4. The optical device according to claim 1, wherein the adjustment unit changes the length of each of the first optical path and the second optical path by changing a position of the first lens in a sub-scanning direction.

5. The optical device according to claim 1, wherein the first lens makes an fθ correction and the second lens makes an optical face tangle error correction.

6. The optical device according to claim 1, wherein at least one of the first lens and the second lens comprises a first informing unit that informs attribute information determined upon individually inspecting optical characteristics of the lens.

7. The optical device according to claim 6, wherein characteristics concerning a scan position are contained in the optical characteristics.

8. The optical device according to claim 7, wherein the characteristics concerning the scan position are characteristics concerning the scan position in a main-scanning direction.

9. The optical device according to claim 6, wherein at least one of the first lens and the second lens is an injection molded lens; and
the first informing unit provided in the lens also informs information on a cavity by which the lens has been molded.

10. The optical device according to claim 1, further comprising a frame that holds the first lens and the second lens, the frame comprising a second informing unit that informs attribute information determined upon inspecting shapes of holding portions for the first lens and the second lens, in the frame.

11. The optical device according to claim 1, wherein the laser light emitting portion is configured to emit laser lights from a plurality of positions differing in a sub-scanning direction;
the second lens comprises a plurality of second lenses that are respectively disposed in correspondence with the laser lights emitted from the individual positions;
the first lens is configured to enter thereinto the laser lights emitted from the plurality of positions, and the number of the first lens is equal to or smaller than that of the second lenses; and
the adjustment unit is configured to adjust lengths of optical paths between the first lens and the second lenses, without altering positions of the first lens.

12. The optical device according to claim 11, wherein the adjustment unit is configured to also alter the position of the first lens.

13. An adjustment method for an optical device according to claim 6, the method comprising:
detecting the attribute information informed by the first informing unit; and
adjusting the length of at least one of the first optical path and the second optical path by the adjustment unit based on the attribute information.

14. An image forming apparatus comprising:
an optical device comprising a laser light emitting portion that emits laser light, a deflector that deflects the laser light emitted from the laser light emitting portion, a first lens through which the laser light reflected by the deflector is transmitted, the first lens refracting the laser light, a second lens through which the laser light having passed through the first lens is transmitted, the second lens refracting the laser light, an adjustment unit, which is provided at the first lens, that adjusts each of a length of a first optical path between the deflector and the first lens and a length of a second optical path between the first lens and the second lens, a mirror disposed in the second optical path, the mirror reflecting the laser light, and a mirror adjustment unit, which adjusts the length of the second optical path by changing a position of the mirror, wherein the mirror adjustment unit corresponds to elliptic eccentric cams whose rotational angles are adjustable, and wherein the elliptic eccentric cams include a set of two adjacent cams, which are provided at the mirror;
a photosensitive member that is exposed to the light by the optical device, thereby to be formed with an electrostatic latent image on a surface thereof;
a development unit that deposits a developer onto the electrostatic latent image to develop the electrostatic latent image; and
a transfer unit that transfers the developer deposited on the surface of the photosensitive member by the development unit, onto a recording medium.

15. The image forming apparatus according to claim 14, wherein the laser light emitting portion is configured to emit laser lights from a plurality of positions differing in a sub-scanning direction;
the second lens comprises a plurality of second lenses that are respectively disposed in correspondence with the laser lights emitted from the individual positions;
the first lens is configured to enter thereinto the laser lights emitted from the plurality of positions, and the number of the first lens is equal to or smaller than that of the second lenses;
the adjustment unit is configured to adjust lengths of optical paths between the first lens and the second lenses, without altering positions of the first lens;
the photosensitive member and the development unit comprise a plurality of photosensitive members and development units respectively, that are respectively disposed in correspondence with the laser lights emitted from the individual positions; and
colors of the developers which the respective development units deposit on the electrostatic latent images of the corresponding photosensitive members are different from one another.

16. The image forming apparatus according to claim 14, wherein the deflector is a polygon mirror having a reflective surface that reflects the laser light, the polygon mirror being driven to rotate and deflecting the laser light emitted from the laser light emitting portion.

17. The optical device according to claim 1, wherein the elliptic eccentric cams contact perpendicularly to a plane of the mirror.

18. The image forming apparatus according to claim 14, wherein the elliptic eccentric cams contact perpendicularly to a plane of the mirror.

* * * * *